United States Patent
Liang et al.

(10) Patent No.: US 9,759,953 B2
(45) Date of Patent: Sep. 12, 2017

(54) SEALANT CURING DEVICE AND MASK PLATE THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Cheng Liang, Beijing (CN); Bin Wen, Beijing (CN); Yansheng Song, Beijing (CN); Huan Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 319 days.

(21) Appl. No.: 14/496,897

(22) Filed: Sep. 25, 2014

(65) Prior Publication Data
US 2015/0314324 A1 Nov. 5, 2015

(30) Foreign Application Priority Data
May 4, 2014 (CN) .......................... 2014 1 0184579

(51) Int. Cl.
*G02F 1/1339* (2006.01)
*B05D 3/06* (2006.01)
(Continued)

(52) U.S. Cl.
CPC ........... *G02F 1/1339* (2013.01); *B05D 3/061* (2013.01); *G02B 5/208* (2013.01); *G02F 1/1303* (2013.01)

(58) Field of Classification Search
CPC ...... G02F 1/1339; G02F 1/1303; B05D 3/061
See application file for complete search history.

(56) References Cited

U.S. PATENT DOCUMENTS 5,534,969 A * 7/1996 Miyake ............... G03F 7/707
250/559.3

FOREIGN PATENT DOCUMENTS

| CN | 1963642 A | 5/2007 |
|---|---|---|
| CN | 101303522 A | 11/2008 |

(Continued)

OTHER PUBLICATIONS

Machine Translation of JP 11030851 A, Feb. 1999.*
(Continued)

*Primary Examiner* — Daniel McNally
(74) *Attorney, Agent, or Firm* — Harness, Dickey & Pierce, P.L.C.

(57) ABSTRACT

The present disclosure provides a sealant curing device and a mask plate thereof. The mask plate includes a light transmission region and a light shielding region. The light transmission region includes at least one through hole defined in the light transmission region. After the completion of exposing and curing sealant, at the beginning of the downward movement of the liquid crystal panel away from the mask plate, the presence of the through holes increases an area of air inlet, thereby increasing air inflow and reducing flow speed of intake air, so as to reduce a pressure difference of an air pressure between the mask plate and the liquid crystal panel and an air pressure of ambient air. Under conditions of same action area, a pressure force generated by the pressure difference and applied to the mask plate may be reduced, thereby reducing load for adsorbing the mask plate via vacuum.

16 Claims, 1 Drawing Sheet

(51) Int. Cl.
  *G02F 1/13* (2006.01)
  *G02B 5/20* (2006.01)

(56) References Cited

FOREIGN PATENT DOCUMENTS

| | | | |
|---|---|---|---|
| CN | 103323971 A | | 9/2013 |
| JP | 11030851 A | * | 2/1999 |
| JP | 200527491 A | | 10/2005 |
| JP | 2009058606 A | | 3/2009 |
| TW | 200827879 A | | 7/2008 |

OTHER PUBLICATIONS

First Office Action regarding Chinese application No. 201410184579.1, dated Apr. 5, 2016. Translation provided by Dragon Intellectual Property Law Firm.

Second Office Action regarding Chinese application No. 201410184579.1, dated Dec. 2, 2016. Translation provided by Dragon Intellectual Property Law Firm.

* cited by examiner

SEALANT CURING DEVICE AND MASK PLATE THEREOF

CROSS-REFERENCE TO RELATED APPLICATION

This application claims priority to Chinese Patent Application No. 201410184579.1 filed on May 4, 2014, the disclosures of which are incorporated in their entirety by reference herein.

TECHNICAL FIELD

The present disclosure relates to the field of liquid crystal display technology, and more particularly to a sealant curing device and a mask plate thereof.

BACKGROUND

Thin film transistor-liquid crystal displays (TFT-LCD) have features such as small size, low power consumption, no radiation, etc., have developed rapidly in recent years and dominated the current flat display device market. A liquid crystal panel is a core component of a TFT-LECD, and includes an array substrate and a color filter substrate that are oppositely arranged to form a cell, as well as liquid crystal filled between the array substrate and the color filter substrate. Currently, a liquid crystal dropping process, that is, one drop fill (ODF) process has been adopted in a cell manufacturing process of the liquid crystal panel. The ODF process specifically includes: first coating liquid crystal and sealant on a surface of the array substrate or the color filter substrate, and then performing a cell alignment process. This requires the sealant around the liquid crystal panel to be cured in the shortest time, so that the liquid crystal is prevented from being polluted by uncured sealant so as not to affect product quality.

The existing sealant curing includes UV curing and thermal curing. In a sealant UV curing device, a mask plate is fixed by a vacuum adsorption device between a UV light source and a liquid crystal panel with sealant to be pre-cured. Specifically, the mask plate may be fixed by a plurality of quartz rods with grooves through vacuum adsorption, and the liquid crystal panel is fixed on a bearing platform. The UV light source is composed of a plurality of UV light tubes which are uniformly distributed above the mask plate and emit downwardly UV light. The mask plate includes a light transmission region and a light shielding region. The UV light passes through the light transmission region to cure the sealant. The light shielding region covers a display region of the liquid crystal panel to protect the display region from being irradiated by the UV light. After completion of the UV curing, the liquid crystal panel is transferred to a thermal curing device, for example, a baking oven, so as to thermally curing the sealant under conditions of greater than 100° C. Finally, after completion of the curing, the liquid crystal panel is cooled.

In production process, the liquid crystal panel with the sealant to be pre-cured is raised by the bearing platform from a delivery position which is far relative to the mask plate (at the delivery position, a distance between the mask plate and the liquid crystal panel is much greater than 3 mm) to an exposure position (where a distance between the mask plate and the liquid crystal panel is about 3 mm), and then exposure is started to cure the sealant. After the completion of the exposure, the liquid crystal panel is moved downwardly from the exposure position to the delivery position. At the beginning of the downward movement, since the distance between the mask plate and the liquid crystal panel is too small, with an increasing distance between the mask plate and the liquid crystal panel, air pressure between the mask plate and the liquid crystal panel is smaller than that of ambient air, i.e., forming a pressure difference. Under action of the pressure difference, ambient air enters into space between the mask plate and the liquid crystal panel through gaps between the mask plate and the liquid crystal panel, and fills the space between the mask plate and the liquid crystal panel. Since the liquid crystal panel is on the bearing platform and is adsorbed by the bearing platform through vacuum adsorption, thus, there is no pressure on one side of the liquid crystal panel. Then, a pressure force generated by the above pressure difference is applied to the mask plate by air above the mask plate, this adversely increases load of the vacuum grooves of the quartz rods for adsorbing the mask plate. When the load exceeds the adsorption capacity of the vacuum grooves of the quartz rods, the mask plate falls from the quartz rods, and sticks to the liquid crystal panel which is located below the mask plate, resulting in damage of the liquid crystal panel.

Currently, in production process, after the completion of the exposure, the movement speed of the liquid crystal panel is reduced to alleviate the above technical problem, but this has seriously affected product yield, and it is difficult to achieve desired effects.

SUMMARY

Embodiments of the present disclosure provides a sealant curing device and a mask plate thereof, which may solve the problem in the prior art that after the completion of using the mask plate to expose and cure the sealant, the movement of the liquid crystal panel away from the mask plate increases the load for adsorbing the mask plate, resulting that the mask plate falls off and damages the liquid crystal panel.

In order to solve the above technical problem, one embodiment of the present disclosure provides a mask plate including a light transmission region and a light shielding region; wherein the light transmission region includes at least one through hole defined in the light transmission region.

Further, the light transmission region includes a first light transmission region and a second light transmission region; the first light transmission region is closer to a center of the mask plate with respect to the second light transmission region; the light transmission region includes a plurality of through holes defined in the first light transmission region and the second light transmission region; the through holes in the first light transmission region have an aperture larger than that of the through holes in the second light transmission region.

Further, the light transmission region includes at least one strip-shaped light transmission region; the at least one strip-shaped light transmission region is symmetrically distributed with respect to a straight line which passes through a center of the mask plate.

Further, the through holes of the light transmission region are uniformly distributed.

Further, the through holes of the light transmission region have a same aperture size.

Further, the through hole has a radius in a range of 20~40 mm.

One embodiment of the present disclosure further provides a sealant curing device including a mask plate and a vacuum adsorption device for fix the mask plate; wherein the mask plate adopts the above mask.

Further, the vacuum adsorption device includes a plurality of transparent rods; the transparent rods include grooves for vacuum adsorption.

Further, the light transmission region comprises a plurality of through holes; the through holes of the mask plate and the transparent rods are distributed in a staggered manner.

Benefit effects of the above technical solution of the present disclosure are as follows.

In the above technical solution, the light transmission region of the mask plate used for curing sealant includes at least one through hole defined in the light transmission region; after the completion of using the mask plate to expose sealant of a liquid crystal panel, the liquid crystal panel is moved downwardly away from the mask plate, and ambient air enters into space between the mask plate and the liquid crystal panel through both of the through hole and gaps between the mask plate and the liquid crystal panel, and fills the space between the mask plate and the liquid crystal panel. The presence of the through hole increases an area of air inlet, thereby increasing air inflow and reducing flow speed of intake air, so as to reduce a pressure difference of an air pressure between the mask plate and the liquid crystal panel and an air pressure of ambient air. Under conditions of same action area, a pressure force generated by the pressure difference and applied to the mask plate by air above the mask plate may be reduced, thereby reducing load for adsorbing the mask plate via vacuum. Meanwhile, the presence of the through hole reduces an action area of the pressure difference on the mask plate, and this further reduces the load for adsorbing the mask plate via vacuum. Therefore, the technical solution of the present disclosure may greatly reduce a risk that the mask plate falls off due to the pressure difference while without reducing downward speed of the liquid crystal panel, and ensure efficiency of mass production.

BRIEF DESCRIPTION OF THE DRAWINGS

In order to illustrate technical solutions according to embodiments of the present disclosure or in the prior art more clearly, drawings to be used in the description of the prior art or the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

Figure 1:
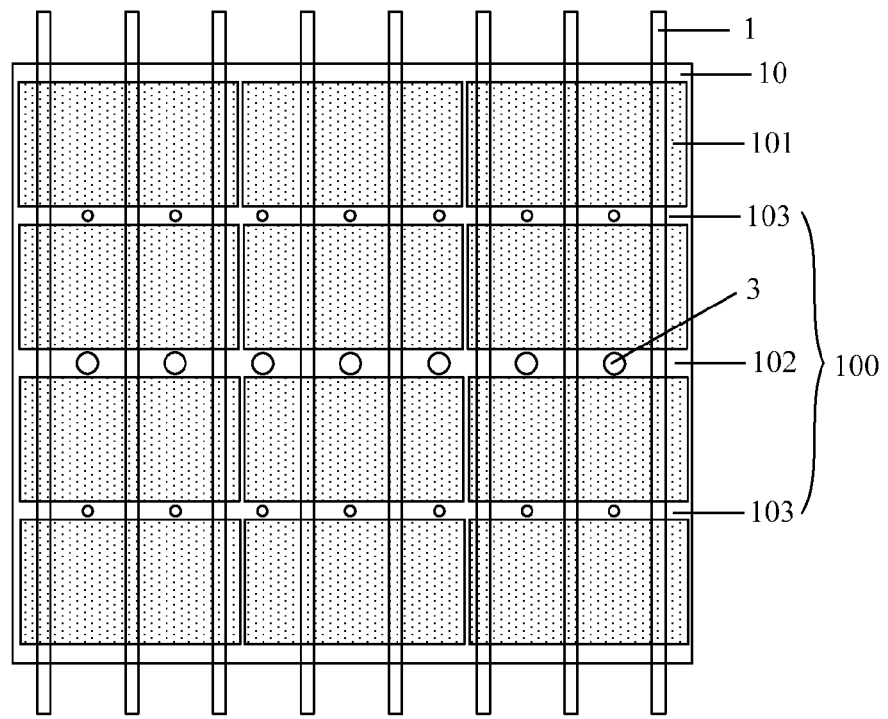
FIG. 1 is a schematic diagram showing fixation of a mask plate according to one embodiment of the present disclosure.

In liquid crystal display technologies, a sealed space is formed by coating sealant around a liquid crystal panel, to prevent overflow of dripped liquid crystal. This requires the sealant to be cured in the shortest time, so that the liquid crystal is prevented from being polluted by uncured sealant so as not to affect product quality. In the prior art, a mask plate is used to perform UV exposure to the sealant, so as to achieve curing of the sealant. The mask plate used for curing the sealant is usually a transparent substrate, such as a glass substrate, a quartz substrate or an organic resin substrate with a thickness not larger than 0.7 mm. The mask plate includes a light transmission region and a light shielding region. The light shielding region is usually formed by plating a metal film on the transparent substrate, and does not allow UV light to pass so as to shade the light. The light transmission region of the transparent substrate is not plated with a metal film, and allows the UV light to pass so as to expose and cure the sealant.

In the exposure process, a distance between the mask plate and the liquid crystal panel is about 3 mm; after the exposure is completed, the liquid crystal panel is moved downwardly away from the mask plate. At the beginning of the downward movement, since the distance between the mask plate and the liquid crystal panel is too small, with an increasing distance between the mask plate and the liquid crystal panel, air pressure between the mask plate and the liquid crystal panel is smaller than that of ambient air, i.e., forming a pressure difference. Under action of the pressure difference, ambient air enters into space between the mask plate and the liquid crystal panel through gaps between the mask plate and the liquid crystal panel, and fills the space between the mask plate and the liquid crystal panel. A pressure force generated by the above pressure difference is applied to the mask plate by air above the mask plate, this adversely increases load for adsorbing the mask plate. When the load exceeds the vacuum adsorption capacity, the mask plate falls downwardly and sticks to the liquid crystal panel which is located below the mask plate, resulting in damage of the liquid crystal panel.

For the above technical problem, embodiments of the present disclosure provide a sealant curing device and a mask plate thereof. The mask plate includes a light transmission region and a light shielding region. The light transmission region includes at least one through hole defined in the light transmission region. After the completion of using the mask plate to expose the sealant of the liquid crystal panel, the liquid crystal panel is moved downwardly away from the mask plate, and ambient air enters into space between the mask plate and the liquid crystal panel through both of the through holes and gaps between the mask plate and the liquid crystal panel, and fills the space between the mask plate and the liquid crystal panel.

In the above technical solution, the presence of the through holes increases an area of air inlet, thereby increasing air inflow and reducing flow speed of intake air, so as to reduce a pressure difference of an air pressure between the mask plate and the liquid crystal panel and an air pressure of ambient air. Under conditions of same action area, a pressure force generated by the pressure difference and applied to the mask plate by air above the mask plate may be reduced, thereby reducing load for adsorbing the mask plate via vacuum. Meanwhile, the presence of the through holes reduces an action area of the pressure difference on the mask plate, and this further reduces the load for adsorbing the mask plate via vacuum.

Thus, the technical solution of the present disclosure may greatly reduce a risk that the mask plate falls off due to the pressure difference while without reducing downward speed of the liquid crystal panel, and may ensure efficiency of mass production.

The sealant curing device and the mask plate of the present disclosure may be used to not only cure the sealant of the liquid crystal panel but also cure sealant of other panels, to solve the problem that the mask plate easily falls off due to the pressure difference in production process.

Implementation of the present disclosure will be described in details hereinafter in conjunction with the accompanying drawings and embodiments of the present disclosure. The following embodiments are presented for illustrative purposes and may not be used to limit the scope of the present disclosure.

First Embodiment

As shown in FIG. 1, this embodiment provides a mask plate 10 used for curing sealant. The mask plate 10 includes a light transmission region 100 and a light shielding region 101. The light transmission region 100 of the mask plate 10 which is used for curing sealant of a liquid crystal panel includes a plurality of strip-shaped light transmission regions (102, 103, shown in FIG. 1) which are horizontally and vertically arranged in cross. Regions defined by the crossed strip-shaped light transmission regions are the light shielding region 101 which corresponds to a display region of the liquid crystal panel. In order to facilitate description, an extension direction of a length of the liquid crystal panel is defined as a horizontal direction, and an extension direction of a width of the liquid crystal panel is defined as a vertical direction.

The light transmission region 100 includes at least one through hole 3 defined through the light transmission region 100. The through hole 3 is mainly used as an air inlet. Also referring to FIG. 2, after the completion of using the mask plate 10 to expose the sealant of the liquid crystal panel, the liquid crystal panel 20 is moved downwardly away from the mask plate 10, and ambient air enters into space between the mask plate 10 and the liquid crystal panel 20 through both of the through holes 3 and gaps between the mask plate 10 and the liquid crystal panel 20 (flow directions of air are represented by arrow directions shown in FIG. 2), and fills the space between the mask plate 10 and the liquid crystal panel 20. The presence of the through holes 3 increases an area of air inlet, thereby increasing air inflow and reducing flow speed of intake air, so as to reduce a pressure difference of an air pressure between the mask plate 10 and the liquid crystal panel 20 and an air pressure of ambient air. Under conditions of same action area, a pressure force applied to the mask plate 10 may be reduced, thereby reducing load for adsorbing the mask plate 10 via vacuum. Meanwhile, the presence of the through holes 3 reduces an action area of the pressure difference on the mask plate 10, and this further reduces the load for adsorbing the mask plate 10 via vacuum.

In the exposure process, since the mask plate 10 is usually located above the liquid crystal panel 20, under action of the gravity, there is a larger vacuum adsorption load at a position close to a center (which usually coincides with a center of gravity) of the mask plate 10. Thus, in this embodiment, the light transmission region 100 of the mask plate 10 includes a first light transmission region 102 and a second light transmission region 103. The first light transmission region 102 is closer to the center of the mask plate 10 with respect to the second light transmission region 103, and the through hole 3 in the first light transmission region 102 has an aperture larger than that of the through hole 3 in the second light transmission region 103, so as to reduce the action area of the pressure difference on the center of the mask plate 10, thereby reducing the pressure force applied on the center of the mask plate 10 and reducing the vacuum adsorption load at the position close to the center of the mask plate 10.

It should be noted, here, "the first light transmission region 102 is closer to the center of the mask plate 10" means that:

a vertical distance from the center of the mask plate 10 to one side of the first light transmission region 102 close to the center of the mask plate 10, is smaller than a vertical distance from the center of the mask plate 10 to one side of the second light transmission region 103 close to the center of the mask plate 10.

Further, for the mask plate 10 used for curing the sealant of the liquid crystal panel, the light transmission region 100 includes at least one strip-shaped light transmission region (such as 102, 103 in FIG. 1), and the at least one strip-shaped light transmission region is symmetrically distributed with respect to a straight line which passes through the center of the mask plate 10, so that vacuum adsorption loads for the mask plate 10 are uniformly distributed.

In order to further achieve the purpose of uniform distribution of vacuum adsorption loads, the through holes 3 of the light transmission region 100 may be uniformly distributed, and the through holes 3 of the light transmission region 100 may have a same aperture size.

The through holes 3 have a radius in a range of 20~40 mm. Specifically, the radius and the number of the through holes may be set according to sizes of the mask plate 10 and distribution of the light transmission region 100.

Second Embodiment

Figure 2:
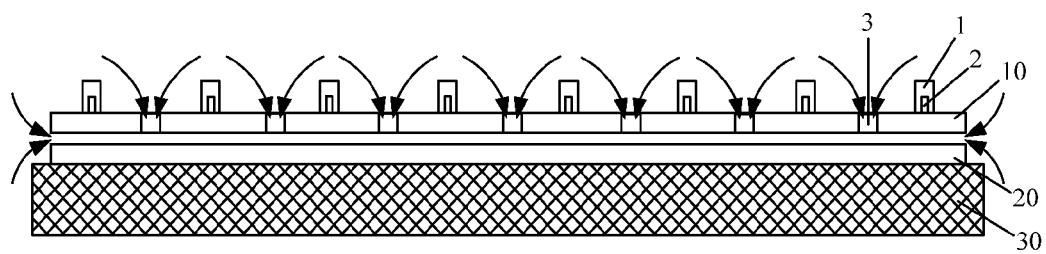
FIG. 2 is a schematic diagram showing partial structures of a sealant curing device according to one embodiment of the present disclosure.

As shown in FIG. 2, one embodiment of the present disclosure provides a sealant curing device. The sealant curing device includes a mask plate 10 and a vacuum adsorption device for fix the mask plate 10. The mask plate 10 adopts the mask plate of the first embodiment, to reduce a risk that the mask plate 10 falls off due to the pressure difference and ensure efficiency of mass production of the sealant curing device.

Specifically, the vacuum adsorption device adsorbs a top surface of the mask plate 10. A bearing platform 30 is arranged below the mask plate 10, and is used for fixing the liquid crystal panel 20 with the sealant to be pre-cured. The bearing platform 30 is driven by a driving device (not shown) to move, so as to cause the liquid crystal panel 20 fixed on the bearing platform 30 away from an exposure position (where a distance between the mask plate 10 and the liquid crystal panel 20 is about 3 mm) or cause the liquid crystal panel 20 fixed on the bearing platform 30 to reach the exposure position.

The vacuum adsorption device may include a plurality of transparent rods 1, such as quartz rods. The transparent rods 1 include grooves 2 for vacuum adsorption. In this embodiment, the quartz rod has a rectangular structure, and has a contact surface with the mask plate 10. The contact surface has a width of 5 cm. The groove 2 is located at a center of the contact surface, and has a width of about 2 mm. A length of the entire groove 2 is smaller than a length of the transparent rod 1. A contact surface between the quartz rod 1 and the mask plate 10 is a smooth plane, so that the groove 2 may form vacuum adsorption so as to fix the mask plate 10 above the liquid crystal panel 20.

Optionally, the through holes 3 of the mask plate 10 and the transparent rods 1 may be distributed in a staggered manner, so as to ensure vacuum adsorption strength of the transparent rods 1 and expose the through holes 3 to increase an area of air inlet.

The principles of the present disclosure will be described with an exemplary implementation.

The liquid crystal panel 20 has a size of 2200*2500 mm; the mask plate 10 of 36.5 inches is used to cure the sealant of the liquid crystal panel 20; the mask plate 10 is adsorbed by eight quartz rods 1 via vacuum; the mask plate 10 is fixed on the bearing platform 30.

As shown in FIG. 1, parts with filling of the mask plate 10 are the light shielding region 101, and other parts of the mask plate 10 are the light transmission region 100. The light transmission region 100 is composed of at least one strip-shaped light transmission region (102, 103 shown in FIG. 1) which is horizontally and vertically arranged in cross. The at least one strip-shaped light transmission region is symmetrically distributed with respect to a straight line which passes through the center of the mask plate 10. Regions defined by the crossed strip-shaped light transmission regions are the light shielding region 101 which corresponds to a display region of the liquid crystal panel 20. The through holes 3 are distributed in the first light transmission region 102 and the second light transmission region 103 which are extended along the horizontal direction.

The first light transmission region 102 has a size of 2500*107 mm; seven through holes 3 are uniformly distributed in the first light transmission region 102 along the vertical direction, and have a radius of 40 mm; each of the second light transmission regions 103 at two sides of the first light transmission region 102 has a size of 2500*67 mm, has seven through holes 3 with a radius of 20 mm defined at positions corresponding to the through holes 3 of the first light transmission region 102.

At the exposure position, the distance between the mask plate 10 and the liquid crystal panel 20 is about 3 mm; the downward speed of the liquid crystal panel 20 is not changed, then an increased area of air inlet is (16800 $\pi$) mm$^2$, a total area of air inlet is three times of an area of air inlet about 28200 mm$^2$ without the presence of the through holes 3, thus, flow speed of intake air may be changed to be ⅓ of an original flow speed. The pressure difference may be reduced to be ⅑ of an original pressure difference.

The presence of the through holes 3 may reduce the action area of the pressure difference on the mask plate 10 by (16800 $\pi$) mm$^2$.

As described above, when applying the technical solution of the present disclosure, after the completion of exposure, the liquid crystal panel 20 is moved downwardly away from the mask plate 10, and the pressure force applied to the mask plate 10 caused by the pressure difference may be ¹⁄₁₀ of an original pressure force applied to the mask plate 10, this may greatly reduce the pressure force applied to the mask plate 10 caused by the pressure difference, reduce the vacuum adsorption load of the quartz rods 1, and greatly reduce a risk that the mask plate 10 falls off during production process.

For the mask plates 10 of other sizes and models used for curing sealant, since positions and sizes of the light transmission region 100 may be varied, thus, positions and the number of the through holes 3 may also be varied according to actual situations. The through holes 3 of different sizes and different numbers may bring different effects. Overall, the larger the total area of the through holes 3 are, the better the effect is.

The foregoing are merely exemplary embodiments of the present disclosure. It should be appreciated that, a person skilled in the art may make further modifications and improvements without departing from the scope of the present disclosure, and these modifications and improvements should also be considered as within the scope of the present disclosure.

What is claimed is:

1. A mask plate comprising a light transmission region and a light shielding region; wherein the light transmission region comprises at least one through hole defined in the light transmission region,
the light transmission region comprises a first light transmission region and a second light transmission region; the first light transmission region is closer to a center of the mask plate with respect to the second light transmission region;
the light transmission region comprises a plurality of through holes defined in the first light transmission region and the second light transmission region; and
the through holes in the first light transmission region have an aperture larger than that of the through holes in the second light transmission region.

2. The mask plate according to claim 1, wherein the light transmission region comprises at least one strip-shaped light transmission region; the at least one strip-shaped light transmission region is symmetrically distributed with respect to a straight line which passes through a center of the mask plate.

3. The mask plate according to claim 2, wherein the light transmission region comprises a plurality of through holes; the through holes of the light transmission region are uniformly distributed.

4. The mask plate according to claim 2, wherein the through holes have a radius in a range of 20~40 mm.

5. The mask plate according to claim 1, wherein the through holes of the light transmission region are uniformly distributed.

6. The mask plate according to claim 1, wherein the through holes of the first light transmission region have a same aperture size;
the through holes of the second light transmission region have a same aperture size.

7. The mask plate according to claim 1, wherein the through holes have a radius in a range of 20~40 mm.

8. A sealant curing device comprising the mask plate according to claim 1 and a vacuum adsorption device for fix the mask plate.

9. The sealant curing device according to claim 8, wherein the vacuum adsorption device comprises a plurality of transparent rods; the transparent rods comprise grooves for vacuum adsorption.

10. The sealant curing device according to claim 9, wherein the light transmission region comprises a plurality of through holes; the through holes of the mask plate and the transparent rods are distributed in a staggered manner.

11. The sealant curing device according to claim 8, wherein the light transmission region comprises at least one strip-shaped light transmission region; the at least one strip-shaped light transmission region is symmetrically distributed with respect to a straight line which passes through a center of the mask plate.

12. The sealant curing device according to claim 8, wherein the light transmission region comprises a plurality of through holes; the through holes of the light transmission region are uniformly distributed.

13. The sealant curing device according to claim 8, wherein the through hole has a radius in a range of 20~40 mm.

14. A sealant curing device comprising a mask plate and a vacuum adsorption device for fix the mask plate; wherein the mask plate comprises a light transmission region and a light shielding region; wherein the light transmission region comprises at least one through hole defined in the light transmission region, the vacuum adsorption device comprises a plurality of transparent rods; and the transparent rods comprise grooves for vacuum adsorption.

15. The sealant curing device according to claim 14, wherein the light transmission region comprises a plurality of through holes; the through holes of the mask plate and the transparent rods are distributed in a staggered manner.

16. The sealant curing device according to claim 14, wherein the light transmission region comprises at least one strip-shaped light transmission region; the at least one strip-shaped light transmission region is symmetrically distributed with respect to a straight line which passes through a center of the mask plate.

* * * * *